H. C. WILKINSON.
BRANDING MACHINE.
APPLICATION FILED MAY 31, 1919.
1,341,449.
Patented May 25, 1920.
2 SHEETS—SHEET 1.
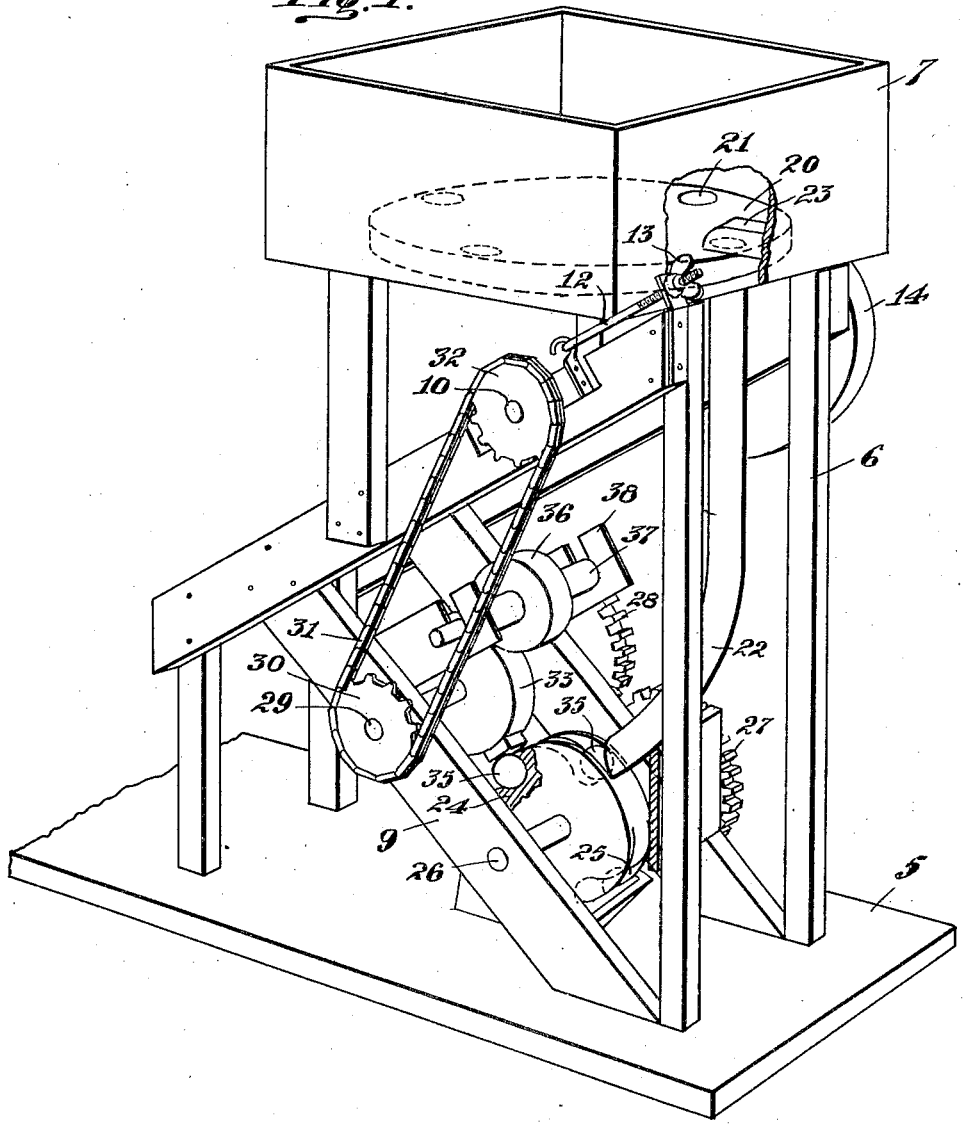
INVENTOR
Harris C. Wilkinson;
BY
ATTORNEY H. C. WILKINSON.
BRANDING MACHINE.
APPLICATION FILED MAY 31, 1919.
1,341,449.
Patented May 25, 1920.
2 SHEETS—SHEET 2.
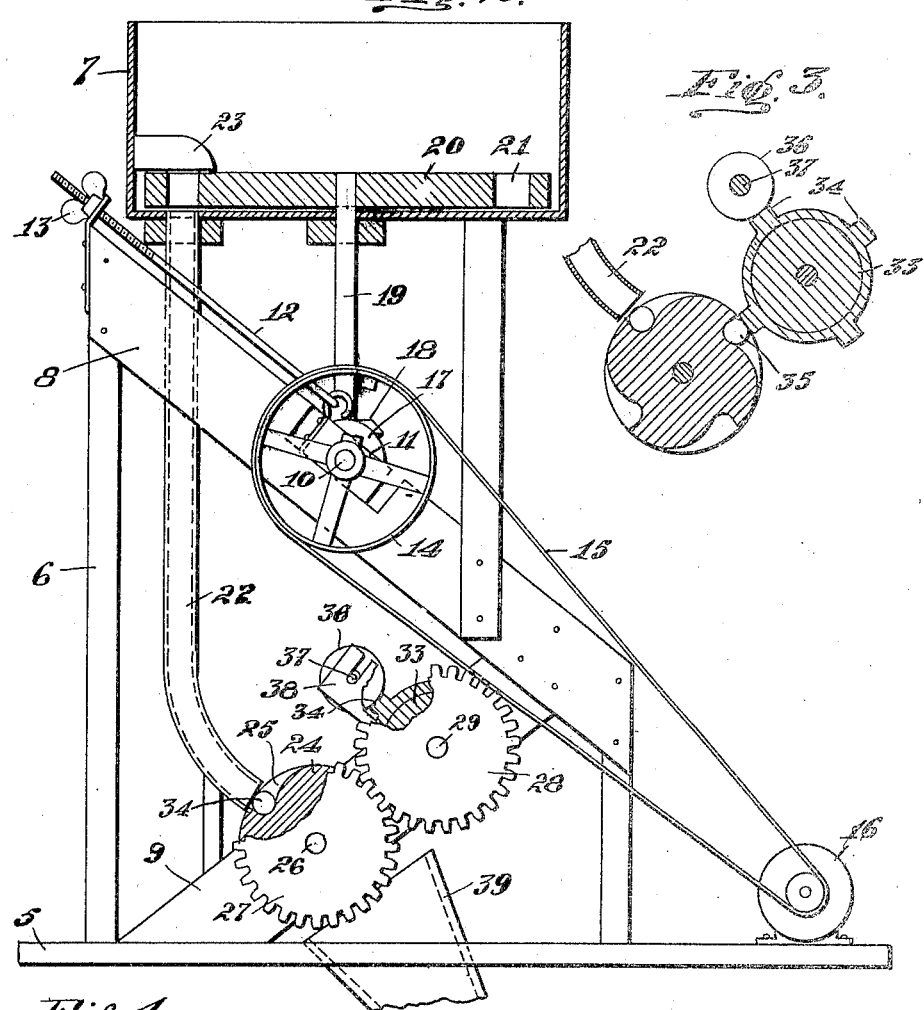
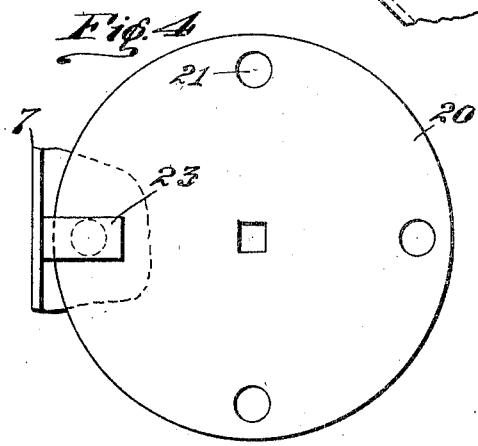
INVENTOR
Harris C. Wilkinson;
BY
ATTORNEY

UNITED STATES PATENT OFFICE.

HARRIS C. WILKINSON, OF LOS ANGELES, CALIFORNIA.

BRANDING-MACHINE.

1,341,449.  Specification of Letters Patent.  Patented May 25, 1920.

Application filed May 31, 1919. Serial No. 300,828.

*To all whom it may concern:*

Be it known that I, HARRIS C. WILKINSON, a citizen of the United States, residing at Los Angeles, in the county of Los Angeles and State of California, have invented new and useful Improvements in Branding-Machines, of which the following is a specification.

This invention relates to a branding machine and particularly pertains to a device for imprinting indicia on articles of substantially spherical form.

It is the object of this invention to provide a mechanism whereby imprints may be made on spherical objects accurately and with considerable rapidity whereby a large output may be obtained and waste caused by misprints reduced to a minimum.

Another object is to provide an effective means whereby spherical articles such as walnuts, ballgum, candies and the like may be delivered successively to a printing device and acted on by the latter to form imprints thereon of any suitable character such for example as trade-marks or other characters.

Other objects will appear hereinafter.

The invention is illustrated in the accompanying drawings in which:

Figure 1 is a perspective view showing a mechanism constructed in accordance with my invention.

Fig. 2 is a view of same as seen partly in side elevation, partly in section.

Fig. 3 is a detail in vertical section illustrating the imprinting mechanism.

Fig. 4 is a detail in plan of the feed member.

More specifically 5 indicates a base member on which is erected a frame 6 of any suitable construction supporting a hopper 7 spaced above the base 5. The frame 6 is here shown as embodying oppositely inclined side members 8 and 9 spaced a convenient distance apart, and extending beneath the hopper. Adjustably mounted on the upper inclined frame members 8 is a drive shaft 10 extending horizontally beneath the hopper and supported in bearing blocks 11 carried by the frame and adjustably mounted thereon; the bearing blocks being adapted to be shifted by means of threaded rods 12 connected to the blocks and engaged by wing-nuts 13 having a bearing relative to the frame and adapted on being rotated to advance or retract the rods and bearings. The shaft 11 is fitted with a pulley 14 around which a belt 15 passes leading from any suitable source of power, here indicated as consisting of a motor 16. Mounted on the shaft is a bevel gear 17 meshing with a companion gear 18 in a vertical shaft 19 extending through the bottom of the hopper 7 and detachably engaging a rotary disk 20. The disk 20 is formed with a series of openings 21 adapted to receive spherical articles disposed in the hopper to advance same on rotation of the disk. Leading from the hopper is a conduit 22 preferably formed of rubber or similar flexible material; the upper end of the conduit opening to the hopper at a point to register with an opening 21 so as to receive an article advanced into said opening. As a means for delivering one article at a time to the conduit 22 a guard 23 is mounted in the hopper and extends over the disk at a point immediately above the open end of the conduit to prevent more than one article entering the conduit through a registering opening; the articles being thus delivered to the conduit at regular spaced intervals apart. The lower end of the conduit terminates adjacent to a wheel 24 and opens to spherical depression 25 therein; the wheel 24 being mounted on a shaft 26 fitted with a spur gear 27 meshing with a gear wheel 28 on a shaft 29. The shafts 26 and 29 are mounted in suitable bearings on the inclined frame members 9. The shaft 29 is fitted with a sprocket wheel 30 around which a sprocket chain 31 passes; the sprocket chain leading from the sprocket wheel 32 on the shaft 10.

Mounted on the shaft 29 is an imprinting roller 33 having resilient imprinting members 34 arranged on its periphery in alinement with the wheel 24 and spaced apart such distance as to register with spherical articles 35 deposited in the peripheral depressions 25 as shown in Fig. 3. The gears 27 and 28 are of corresponding diameter so that the shafts 26 and 29 rotate at corresponding speeds and the diameters of the wheel 24 and roller 33 correspond so that the imprinting members will come opposite the depressions in the wheel. An inking roller 36 is mounted on a shaft 37 supported in slotted bearing 38 and arranged to deliver ink to the imprinting members 34 as the latter come in contact therewith.

In the operation of the invention a series of the spherical articles are placed in the hopper and the shaft 10 rotated so as to drive the disk 20 and the shafts 26 and 29. On rotation of the disk 20 the articles are delivered one at a time to the conduit 22 and conveyed to the wheel 24 by which they are advanced to the imprinting member and acted on thereby. The article in being carried beyond the imprinting member is deposited in the hopper 39 leading to any suitable point of discharge.

While I have shown and described a specific embodiment of my invention it is obvious that various changes may be made in the details of construction thereof without departing from the spirit and scope of the invention as set forth in the appended claims.

I claim:

1. In a machine for branding spherical articles, a hopper adapted to contain spherical articles, a conduit leading downwardly from said hopper, a disk in said hopper having openings therethrough adapted to receive the spherical articles and arranged to register with the open upper end of said conduit, a guard in said hopper extending over the disk and close thereto opposite the open upper end of the conduit, a rotary wheel located with its periphery adjacent to the lower end of the conduit and having depressions adapted to receive the spherical articles delivered from the conduit, an imprinting roller, adjacent said wheel, printing characters on said roller arranged to imprint on articles carried by the wheel, and means for driving said disk, wheel and roller in unison.

2. In a machine for branding spherical articles, a hopper adapted to contain spherical articles, a conduit leading downwardly from said hopper, a disk in said hopper having openings therethrough adapted to receive the spherical articles and arranged to register with the open upper end of said conduit, a guard in said hopper extending over the disk and close thereto opposite the open upper end of the conduit, a rotary wheel located with its periphery adjacent to the lower end of the conduit and having depressions adapted to receive the spherical articles delivered from the conduit, an imprinting roller, adjacent said wheel, printing characters on said roller arranged to imprint on articles carried by the wheel, means for driving said disk, wheel and roller in unison, including a drive shaft extending beneath the hopper, means for rotating said disk from said drive shaft, gear connections between said wheel and imprinting roller, and means for driving said gear connections from said drive shaft.

HARRIS C. WILKINSON.